United States Patent Office

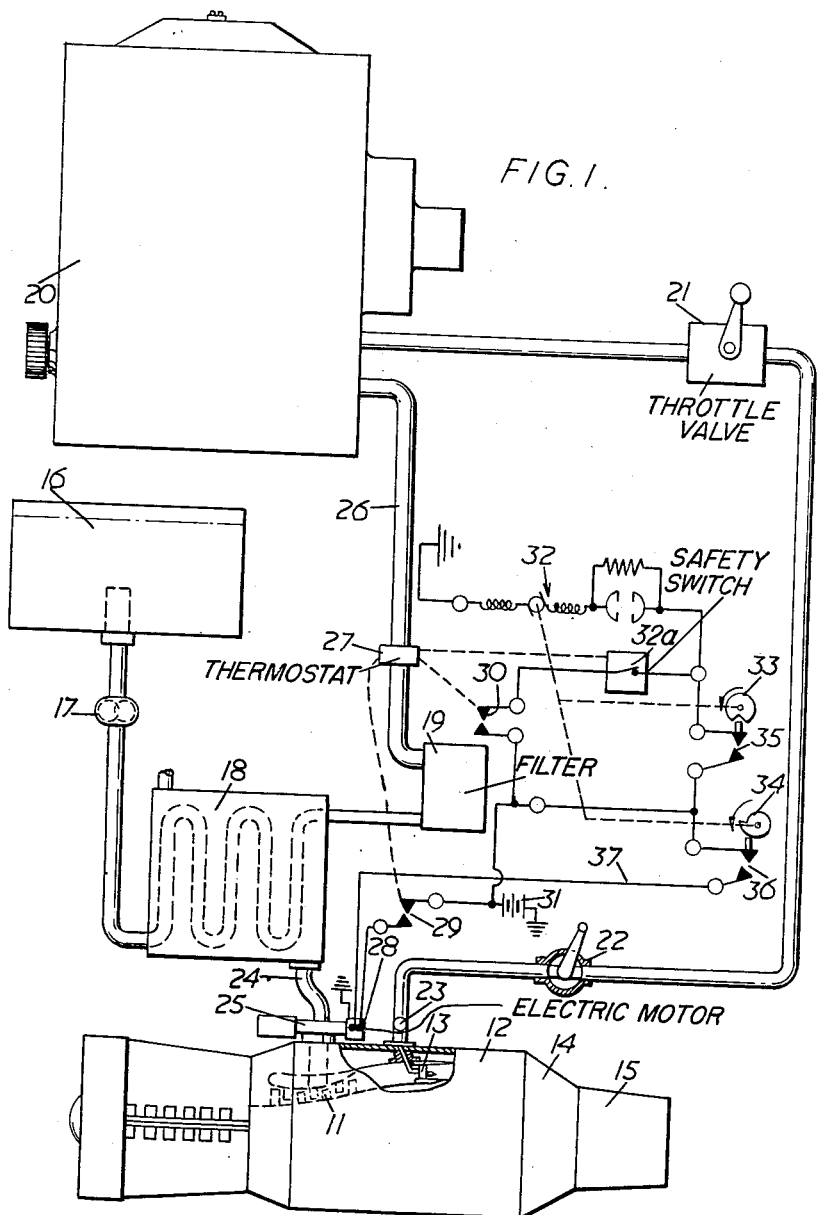

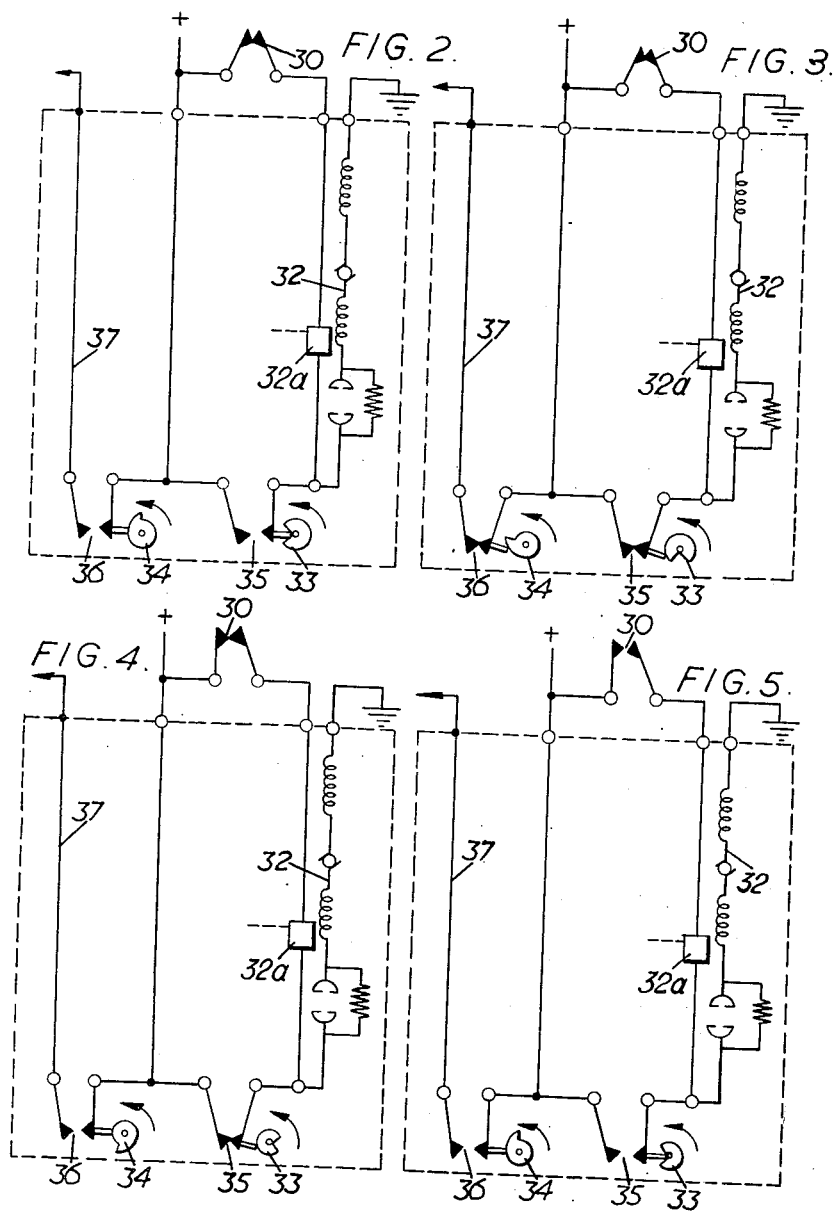

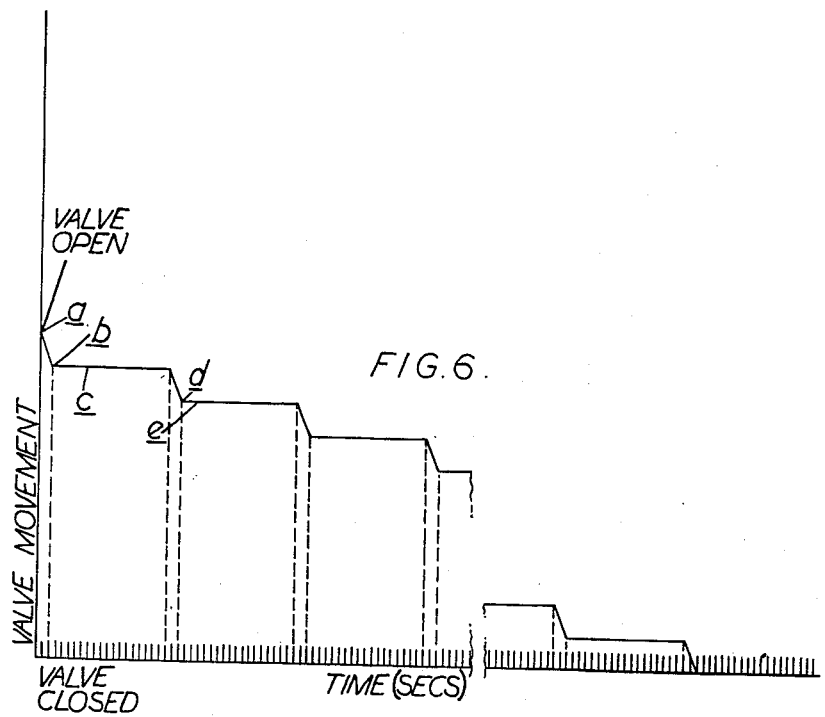

3,049,878
Patented Aug. 21, 1962

3,049,878
FUEL HEATING SYSTEM FOR A GAS TURBINE ENGINE
Donald George Goodall, Hucknall, England, and Jacques Charles Henri Joseph Lepers, Toulouse (Hte Garonne), France, assignors to Rolls-Royce Limited, Derby, England, a British company, and Sud-Aviation, Société Nationale de Constructions Aeronautiques, Paris, France, a French company
Filed Sept. 17, 1959, Ser. No. 840,601
Claims priority, application Great Britain Sept. 25, 1958
6 Claims. (Cl. 60—39.07)

This invention relates to fuel heating systems for gas turbine engines.

It is usual in gas turbine engine fuel systems to heat the fuel flowing to the engine to prevent the formation of ice on fuel filters etc.

In earlier proposals the fuel has been heated prior to flowing through the main fuel filter by passing it through a heat exchanger supplied with hot gases from the engine, the supply of hot gases being controlled by suitable control means actuated, either to increase or to decrease the supply, in response to the formation of ice on the main fuel filter. The hot gases are usually hot air tapped from the compressor of the engine and the air is generally supplied through a valve which is moved to the fully open position when the main filter becomes contaminated with ice and closed when the ice has melted.

The above mentioned prior proposal suffers from the disadvantage that when the ice melts water is released from the main fuel filter which reforms as ice in other parts of the fuel system such as the fine gauze filters in the fuel control.

In order to overcome this disadvantage it has also been proposed to heat the fuel continuously to maintain a temperature above 0° centigrade. It has been proposed to achive this either by opening or closing the hot air control valve progressively in response to changes in the temperature of the fuel. This gives rise to a further disadvantage in that owing to time lags in the system, particularly in the fuel heater, the time required to sense the change in fuel temperature once the control valve has received the signal to open or close the valve results in a greater change in fuel temperature than required. As a result, there is an appreciable waste of hot air and an increase in the fuel consumption of the engine, when the valve is moving in the direction giving an increase in fuel temperature, or alternatively control instability occurs if an attempt is made to hold the fuel temperature within a narrow range.

The object of the present invention is to provide a fuel heating arrangement in which the amount of hot air supplied to the heat exchanger is only sufficient to heat the fuel to the desired temperature and which provides stable control within a narrow temperature range.

According to the present invention a fuel heating system for a gas turbine engine comprises heating means adapted to heat the fuel; control means for controlling the quantity of heat supplied by said heating means; and a temperature sensitive device arranged to set in motion a cycle of operations to adjust the control means until sufficiently to give a predetermined fuel temperature; said temperature sensitive device comprising means, brought into operation upon sensing an undesirable fuel temperature, to adjust the control means to a first position followed by a dwell period to allow said fuel temperature to stabilise, means to adjust the control means to a second position if the fuel temperature has not reached said predetermined fuel temperature, and means for repeating the cycle if necessary until said predetermined fuel temperature is reached.

Said heating means may comprise an electrical heater or any other convenient source of heat. Preferably, however, the heating means comprises a heat-exchange device arranged to be supplied with hot air from the engine.

The system can include a timing device adapted to carry out the cycle of operations. Said timing device can include an electrical motor which can in turn drive cams to open and close electrical contacts, said contacts controlling operation of an actuator for adjusting the control means.

Preferably the control means comprises a control valve and said cycle of operation comprises the following steps:

(a) opening or closing the control valve a predetermined increment to a first position;

(b) holding the control valve in the predetermined first position to allow the fuel temperature to stabilise.

(c) sensing the new fuel temperature and opening or closing the control valve a further predetermined increment to a second position if the fuel temperature has not reached the desired temperature;

(d) repeating this procedure a number of times unless the fuel temperature reaches the desired level in which case the valve remains in a fixed position.

Preferably the control valve is closed by said increments and, prior to the control valve being closed to the first position, the control valve is opened and is retained in the opened position for a predetermined period.

Means may be provided, operative upon the control valve being fully closed, to prevent an attempt to close the control valve by a further predetermined increment. Thus the last-mentioned means may be arranged to prevent operation of the timing device.

The control valve can be, for example, a butterfly valve or a slide valve in a conduit conveying air tapped from the compressor of the gas turbine engine to an air/fuel heat exchanger.

In a preferred embodiment of the invention the cycle of operations is applied during the closing movement of the control valve, the opening movement of the valve being continuous.

In a second embodiment of the invention the cycle of operations is applied during the opening movement of the control valve, any closing movement of the valve being continuous.

In a third embodiment of the invention the cycle of operations is applied to both the opening and closing movements of the control valve.

It will be appreciated that by moving the control valve a small increment and then holding it in that position to allow the system to settle down to a stable temperature, followed by moving the control a further increment, if need be, and again holding it at this position allowing a stable temperature to be reached again it is possible to maintain a flow of hot air to the heat exchanger just sufficient to maintain the fuel at the predetermined temperature, thus avoiding any wastage of hot air and also to prevent hunting of the system whilst controlling within a narrow temperature range.

The invention is illustrated, merely by way of example, in the accompanying drawings, in which:

FIGURE 1 shows very diagrammatically a gas turbine engine and fuel heating system incorporating the invention;

FIGURES 2–5 show different stages in operation of the electro-mechanical circuit controlling the fuel heating; and FIGURE 6 is a graph showing valve movement plotted against time for a complete cycle.

In FIGURE 1 is shown a gas turbine engine 10 having a compressor 11 which supplies compressed air to a combustion chamber 12 where the air is burned with fuel supplied from fuel injectors 13. The products of combustion are used to drive a turbine 14 before passing to atmosphere through a propelling nozzle 15.

The fuel is supplied to the engine 10 from a supply tank 16 from which the fuel is drawn by a backing pump 17 and is delivered through a heat exchanger 18 and main fuel filter 19 to the inlet side of the main engine pump 20.

High pressure fuel from the main pump 20 is delivered to the burners 13 via a fuel control unit 21, shut-off cock 22 and a manifold 23 which is connected to each of the burners 13.

The heat exchanger 18 is supplied with hot air tapped from the compressor 11 and this air is conveyed through a conduit 24 which contains a control valve 25.

The hot air which passes from the control valve 25 enters the heat exchanger 18 to heat the fuel, when required.

The filter 19 is connected to the inlet side of the main engine pump 20 through a conduit 26 in which there is provided a temperature sensing element such as thermostat 27. The control valve 25 is operated by an electric motor 28 and can be, for example, a sliding valve or a rotating butterfly-type, valve.

The temperature sensing element 27 is arranged to operate two sets of contacts indicated at 29 and 30, the contacts 30 forming part of an electrical timing circuit.

The timing circuit includes a source of electrical voltage indicated at 31 which supplies electrical voltage, when the circuit is in operation, to a timing motor 32 via a safety switch 32a under control of thermostat 27. The motor 32 is arranged to rotate a pair of cams 33, 34. Cam 33 is arranged to operate a pair of electrical contacts 35 and cam 34 is arranged to operate a second pair of contacts 36.

In the operation of the fuel heating system, when the temperature sensing element 27 senses a fuel temperature below a predetermined temperature, the element 27 closes the contacts 29. This allows electrical current to flow from the source of electrical voltage 31 to the first field winding (not shown) of the electric motor 28 which moves the control valve 25 towards the fully open position. Opening of the valve 25 allows the hot air to be conveyed through the conduit 24 to the heat exchanger 18. The thermostat reopens contacts 29 when the fuel temperature increases above the predetermined value.

The temperature of the fuel flowing from the heat exchanger 18 will continue to rise and when the temperature reaches a predetermined value above the value required for thermostat 27 to reopen the contacts 29 the thermostat 27 closes contacts 30 and the timing circuit will be in the state shown in FIGURE 2 in which the electrical voltage from source 31 is now supplied through the closed contacts 30 to the timing motor 32 via the safety switch 32a.

The timing motor 32 will rotate the cams 33 and 34 to the position shown in FIGURE 3 in which the contacts 35 and 36 are closed and the electrical voltage from source 31 is applied via a connection 37 to a second field winding (not shown) of the electrical motor 28 (FIGURE 1), the current flowing through the second field winding causing the motor to rotate in the opposite direction to that in which it is rotated when the current flows through said first field winding via contacts 29. Contacts 35 are closed and shunt the contacts 30 to keep the motor in operation. The contacts 36 operated by cam 34 will remain closed, for, say, a period of 2 seconds (assuming a total operating time for valve 25 of the order of 2 mins.) during which time the electric motor 28 will have closed the control valve 25 a small increment which will reduce the flow of hot air to the heat exchanger 18. The motor 32 then opens the contacts 36 and valve 25 becomes stationary.

This position is held for a period of 18 to 20 seconds determined by the rotation of cam 34, during which time the temperature of the fuel will have stabilised to a lower value. The condition of the electric timing circuit during this time is shown in FIGURE 4. If the fuel temperature falls to within the predetermined control temperature range by the end of this period the circuit will be in the condition shown in FIGURE 5 in which the contacts 30 are opened by this temperature and the contacts 35 opened by the operation of motor 32, thus then cutting off the supply of current to this timing motor. The cycle is therefore discontinued when the stabilised fuel temperature reaches a predetermined value. The cam 33 and contacts 35, by providing a connection between the battery 31 and the motor 32 which by-passes contacts 30, insures that regardless of the precise moment when the contacts 30 are opened, the motor will come to rest with the cams 33, 34 in predetermined positions, i.e. when cam 33 opens contacts 35 and cam 34 opens contacts 36. It is the opening of contacts 35 and not the opening of contacts 30 which cause the motor 32 to stop.

If the stabilised fuel temperature is not at the predetermined control temperature at the end of the first cycle, that is to say when contacts 35 and 36 are broken by their respective cams, the contacts 30 will remain closed and the timing motor will continue to operate and thus repeat the cycle causing the control valve 25 to close a further increment thus further reducing the flow of hot air and lowering the temperature of the fuel. It will be seen therefore that the flow of hot air to the heat exchanger 18 is reduced to a value which is just sufficient to maintain the temperature of the fuel at a predetermined value. If the temperature rises above the predetermined value then the timing circuit operates to reduce the air flow by increments and if the temperature falls below the predetermined value then the air flow is rapidly increased.

If the temperature of the fuel stabilises above the predetermined temperature at which the sensing element 27 causes the contacts 30 to close, when the control valve 25 is fully closed, the safety switch 32a is opened by the thermostat element 27 to prevent electrical current flowing to the timing motor 32.

In FIGURE 6 is shown the valve closing movements plotted against time.

During the first 2 seconds the valve is moved from the fully open position shown at $a$ to a position in which it is closed a small increment shown at $b$. It is held in this position for 18–20 seconds as represented by the line $c$. If a second cycle is required the valve is closed from $c$ to $d$ and held at $d$ for a period of time represented by the line $e$. This cycle is repeated as often as necessary.

Instead of controlling the closing of the control valve 25 as described it may be desirable to control the opening of the control valve 25 in which case the contacts 30 will be closed upon the temperature sensing device 27 sensing a fuel temperature below a predetermined value in order to cause incremental opening of the control valve 25 and the contacts 29 will be closed upon the device 27 sensing a fuel temperature above a predetermined value in order to close the control valve 25.

In a further alternative arrangement both the opening and the closing movements of the control valve 25 may be under the control of a time control circuit or circuits.

It will be appreciated, also, that the intention of the systems described is to control the flow of hot air on a time basis rather than a temperature rise basis, since an appreciable time may elapse before a significant temperature rise can be sensed by the temperature sensing device 27.

We claim:

1. A fuel heating system for a gas turbine engine comprising means for heating the fuel as it is fed to the engine, means for controlling the quantity of heat supplied by said heating means, drive means connected for adjusting said control means, a temperature sensing device responsive to the temperature of the fuel passing said heating means, means controlled by said sensing device upon a deviation of fuel temperature beyond one end of a predetermined temperature range to cause said drive means to adjust said control means to one limit of its range of adjustment whereby the fuel temperature is adjusted towards and passes through said predetermined temperature range, a timing device separately controlled by said temperature sensing device when sensing a deviation of fuel temperature beyond the opposite end of said predetermined temperature range and means actuated by said timing device to effect successive intermittent stepwise adjustment of the control means to adjust the fuel temperature towards said predetermined temperature range, said temperature sensing device being connected to terminate said stepwise adjustment of the control means when the fuel temperature moves within said range.

2. A fuel heating system for a gas turbine engine comprising means for heating the fuel as it is fed into the engine, means for controlling the quantity of heat supplied by said heating means, a reversible electric motor for adjusting said control means, a temperature sensing device responsive to the temperature of the fuel passing said heating means, first and second electric circuits connected to rotate the electric motor respectively in opposite directions, said first circuit including a switch closed by the temperature sensing device when sensing a deviation of fuel temperature beyond one end of a predetermined temperature range to energize the electric motor to adjust said control means to one limit of its range of adjustment whereby the fuel temperature is adjusted towards and passes through said predetermined temperature range, said second circuit including a contactor, an electrical timing device for operating said contactor, intermittently, a second switch for energizing said timing device and closed by the temperature sensing device when sensing a deviation of fuel temperature beyond the opposite end of the fuel temperature range, to thereby close said contactor each time for a fraction of the total operating period of said adjustable control means over its range whereby said second circuit is momentarily completed and the electric motor effects a stepwise adjustment of the adjustable control means so that the fuel temperature is adjusted towards said predetermined temperature range, said electrical timing being arranged to maintain said contactor open after each momentarily closure thereof for a predetermined period to allow the fuel temperature to stabilize, the temperature sensing device being connected to determine by respectively closing or opening said second mentioned switch, whether another stepwise adjustment of the adjustable control means in the same direction is to be effected.

3. A fuel heating system as claimed in claim 2 in which said electrical timing device includes an electric motor, a power circuit for supplying current thereto, said power current including said second switch, and means driven by the electric motor which effects said momentarily closure of said contactor and then maintains the contactor open for said predetermined period.

4. A fuel heating system as claimed in claim 3 in which said electrical timing circuit includes a branch circuit connected in parallel with said second switch, said branch circuit including a second contactor, said means driven by the electric motor opening both said first mentioned contactor and said second contactor after said predetermined period.

5. A fuel heating system as claimed in claim 3 in which said power circuit includes a safety switch, said temperature sensing device being connected to open said safety switch when the fuel temperature sensed thereby exceeds a predetermined safe fuel temperature.

6. A fuel heating system for a gas turbine engine comprising means for heating the fuel as it is fed to the engine, means for controlling the quantity of heat supplied by said heating means, a reversible electric motor connected for adjusting said control means, a temperature sensing device responsive to the temperature of the fuel passing said heating means, first and second electric circuits connected to rotate the electric motor respectively in opposite directions of rotation, said first circuit including a switch arranged to be closed by the temperature sensing device on sensing a deviation of fuel temperature below the lower end of a predetermined temperature range to energize the electric motor to adjust said control means to that limit of its range of adjustment so that the fuel temperature is raised and passes through said predetermined temperature range, said second circuit including a contactor, an electrical timing device for operating said contactor intermittently, a second switch for energizing said timing device and closed by the temperature sensing device when sensing a deviation of fuel temperature above the upper end of the fuel temperature range, to thereby close said contactor for a fraction only of the total operating period of said adjustable control means, whereby said second circuit is momentarily completed and the drive means effects a stepwise adjustment of the adjustable control means so that the fuel temperature is adjusted towards said predetermined temperature range, said electrical timing device being arranged to maintain said contactor open after each momentary closure thereof for a predetermined period to allow the fuel temperature to stabilize, the temperature sensing device being connected to determine, by respectively closing or opening said second mentioned switch whether another stepwise adjustment of the control means in the same direction is to be effected.

References Cited in the file of this patent

UNITED STATES PATENTS

| 2,304,802 | Crew | Dec. 15, 1942 |
| 2,365,709 | Lilja | Dec. 26, 1944 |
| 2,925,712 | Johnson et al. | Feb. 23, 1960 |

FOREIGN PATENTS

| 687,872 | Great Britain | Feb. 23, 1953 |
| 749,684 | Great Britain | May 30, 1956 |

(Corresponding U.S., 2,925,712, Feb. 23, 1960)